Figure 1:
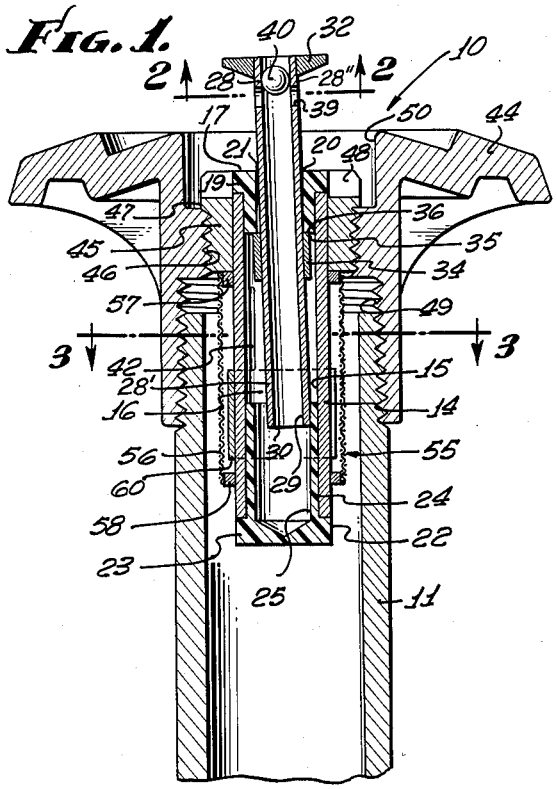

April 25, 1961 J. O. HRUBY, JR 2,981,481
SPRINKLER
Filed May 17, 1957

JOHN O. HRUBY, JR.
INVENTOR.
Huebner, Beehler, & Worrel
BY
ATTORNEYS.

United States Patent Office 2,981,481
Patented Apr. 25, 1961

2,981,481
SPRINKLER
John O. Hruby, Jr., Burbank, Calif., assignor, by mesne assignments, to Rain Jet Corporation, Burbank, Calif., a corporation Filed May 17, 1957, Ser. No. 660,002
4 Claims. (Cl. 239—206)

This invention relates to fluid discharging devices which are especially well suited for employment as lawn sprinklers. The fluid discharging devices of this invention are similar in certain structural features thereof to the sprinklers illustrated and described in Letters Patent of the United States No. 2,639,191 issued to me on May 19, 1953.

The sprinklers disclosed in said patent are characterized by a tubular stem disposed longitudinally in a sprinkler body and arranged to be both rotated on the stem axis and gyrated in the body with the axis of the stem being inclined with respect to the axis of the body. In sprinklers of this type, the stem may be adapted to extend upwardly from the sprinkler head when water is admitted to the sprinkler. When so adapted the sprinkler is of the "pop-up" type in which streams of water are discharged radially outwardly through orifices in the upper end of the stem, and when the water supply is turned off the stem drops downwardly into the sprinkler body to a position where it will not be damaged by traffic over the lawn.

The combined actions of gyration of the stem in the sprinkler body and rotation of the stem on its axis provides for even distribution of water droplets over the area being sprayed. The gyration action provides for upward and downward movement of the streams of water from the stem orifices with the result that at a given point in the rotation of a stem one of the streams is directed outwardly to fall on the periphery of the area being sprayed, and as rotation of the stem is continued that stream is directed inwardly from the periphery and thence outwardly again, each of the other streams likewise alternating in their action of moving outwardly toward and then inwardly from the periphery of the area being sprayed as the stem is rotated, thereby to evenly distribute the spray over a wide area around the sprinkler.

In the sprinkler illustrated in Patent No. 2,639,191 the stem of the sprinkler extends through the inner end of the sprinkler body and is open at the inner end of the stem for flow of water directly from the water supply pipe into and up through the stem. In that sprinkler the water flows through the sprinkler in two separate passageways, one through the stem and the other through the body of the sprinkler for imparting gyration and rotation to the stem. Such construction produces a spray of relatively high rate of water discharge, i.e. high gallonage (gal./min./sq. ft.).

For some installations it is desired to spray a large area for a long period of time, whereby the sprayed water may soak into the ground and not run off the surface of the ground. This is effected by sprays of low gallonage. Reducing the pressure in the water supply line of a given sprinkler installation as by operating a valve in the water supply line, does not produce the desired low gallonage spray, because a reduction in pressure merely results in a corresponding reduction in the size of the area covered by the spray.

It is a general object of this invention to provide an improved fluid discharging device of the above mentioned character which is especially well adapted for spraying water over a large area at a relatively low gallonage.

The present invention provides a sprinkler of the type having a gyratory and rotary water discharging stem which does not extend through the inner end of the sprinkler body, but instead extends only into the body passageway whereby the flow of water through the sprinkler is such that water is admitted to the body from the supply line for imparting gyratory motion to the stem and then flows through the stem and is sprayed outwardly around the sprinkler.

An ancillary advantage had from the present invention is that increased pop-up of the stem is permitted with a given length for the stem and a given length for the sprinkler body, i.e. the sprinklers of this invention may be made to provide for extended pop-up of the stem, even with a sprinkler of relatively short length.

Another object of the invention is to provide a sprinkler of the above mentioned character in which the rate of flow of water into the sprinkler may be controlled.

Still another object of this invention is to provide an improved sprinkler which is adapted to accommodate an effective filter for preventing solids carried in the water supply from entering the sprinkler.

Figure 2:
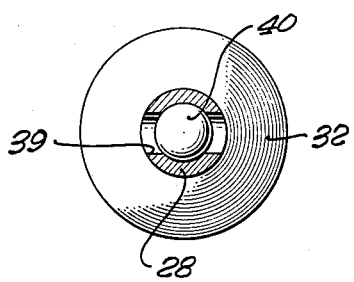
Figure 3:
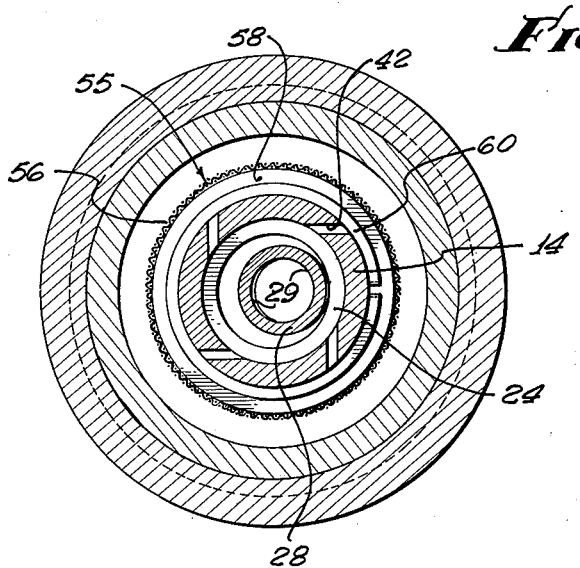

Further objects and advantages of the invention will appear during the course of the following part of this specification wherein the details of construction and mode of operation of a preferred embodiment of the invention are described with reference to the accompanying drawing, in which:

Fig. 1 is a central vertical section through a sprinkler embodying the invention; and Figs. 2 and 3 are transverse sections taken on an enlarged scale and as indicated by lines 2—2 and 3—3, respectively, on Fig. 1.

Referring to the drawing in greater detail and with the use of reference numerals, there is shown a sprinkler embodying the invention, designated generally by numeral 10. The sprinkler is secured on the top of a riser pipe 11 which is connected at its lower end to a supply pipe (not shown) of a sprinkler system.

The sprinkler 10 comprises a hollow body 14 having inside walls 15 defining a cavity 16 in the body which in the illustrated embodiment is formed as a bore of circular cross-section. An annular end face 17 defines the upper or outer end of the body. A bearing sleeve 19 is force-fitted into the upper end of the bore 16, the inside wall 20 of the sleeve defining an opening 21 for the bore. A hollow plug 22 having an end plate portion 23 and a sleeve portion 24, which defines a bore 25 of the plug, is force-fitted into the lower or inner end of the cavity bore 16, whereby the plate portion 23 closes the inner end of the bore 16 and defines the inner end of the body 14.

Arranged longitudinally in the body cavity is a tubular stem 28 which extends outwardly of the opening 21. Numeral 29 designates the axially extending passage or bore of the stem, the same being open in the lower end portion 28' of the stem as an inlet opening 30 for the reception of water from the body cavity.

There is a head 32 arranged as a collar around the upper end portion 28'' of the stem, the same being larger in diameter than the opening 21. The stem is movable longitudinally in the body cavity and it is moved upwardly to the position thereof shown in Fig. 1 of the drawing, by the force of water flowing through the sprinkler. Thus the sprinkler 10 is a "pop-up" type sprinkler. When water to the sprinkler is turned off, the stem drops down into the body until the head 32 seats on the rim which defines the opening 21.

A collar 34 is fixed around the upper part of that portion of the stem contained in the body cavity. Upward movement of the stem in the body is limited by engagement of the upper end shoulder 35 of the collar 34 against the lower end shoulder 36 of the sleeve 19 thus to retain the stem in the body and permit rotation of the stem on its own longitudinal axis.

Adjacent the underside of the head 32, the stem has a circumferentially arranged series of orifices or outlet openings 39 formed therein, there being two such orifices in the illustrated embodiment. Water passes upwardly in the stem and outwardly through the orifices 39 in streams extending radially outwardly from the sprinkler. The stem bore is closed at its upper end by a plug in the form of a ball 40 which extends downwardly beyond the upper edge of each of the orifices 39 thereby to deflect the streams of water from the orifices in a slightly upward direction.

There is a plurality of apertures 42 formed in the side wall of the body for admitting water into the body cavity from the riser 11. In the illustrated embodiment these apertures are formed as slits which extend longitudinally with respect to the sprinkler body. As best shown in Fig. 3, these slits extend through the body side wall at an angle with respect to the radii of the body passage, thus causing streams of water to enter the body passage and spiral or rotate around in the body cavity. The slits 42 are preferably tangential with respect to the body cavity and in the illustrated embodiment are four in number. The swirl of water in the body cavity resulting from the slant of the slits 42 causes the stem to revolve or gyrate within the body cavity with the axis of the stem being inclined with respect to the axis of the body cavity as appears in Fig. 1 of the drawing.

The stem is of sufficient length to have its inner end contact the inside wall of the sleeve 24 when the stem is in a pop-up position so that the stem in being gyrated rolls within and in contact around each of the sleeves 19 and 24, whereby the stem is caused to rotate on its own axis. The sleeves 19 and 24 are preferably formed of wear resistant laminated phenolic composition to increase the life of the sprinkler.

Inasmuch as the stem is designed to be gyrated in the body cavity with the axis of the stem inclined with respect to the axis of the body cavity, the bore 20 of the bearing sleeve 19 is made slightly larger in diameter than the stem in order to accommodate inclination of the stem in the sprinkler body.

The fluid discharging device of this invention is designed as a lawn sprinkler by providing a casting 44 into which the body 14 is disposed. For connecting the body to the casting there is a collar 45 secured around the upper end of the flanged portion of the body, such collar being screw-threaded as shown at 46, whereby the sprinkler body may be received in an axial opening 47 of the casting. There is a diagonally extending groove or key-way 48 formed in the upper end face of the collar to accommodate a key (not shown) for turning the body into the casting. The casting 44 is screw-threaded as at 49 for securing the same around the upper end of the riser 11 to close the upper end of the riser. A central recess 50 is present in the casting for receiving the collar portion 45 of the sprinkler body. This recess also serves to receive the stem head when the stem drops down in the body to its stand-by position, thus to protect the stem from damage by traffic over the lawn.

In operation, water from the riser enters the body cavity through the slant slits 42 and swirls around in the body cavity. The pressure of water in the body cavity causes the stem to pop-up to the position thereof shown in Fig. 1 of the drawing with the stem head 32 being spaced upwardly from the upper end face 17 of the body, upward movement of the stem in the body being limited by engagement of the stop or collar 34 of the stem with the bearing sleeve 19. The collar 34 substantially closes the small space within the bearing sleeve around the stem. Water within the body cavity is caused to enter the inlet opening 30 of the stem and to flow upwardly through the stem and out through the orifices 39. The swirl of water in the body cavity causes the stem to gyrate in the body cavity and as the stem contacts the bearing sleeves 19 and 24, the stem is caused by rolling against the annular walls of these sleeves to rotate on its axis. Thus the streams of water from the orifices 39 move not only around the sprinkler due to rotation of the stem on its axis, but also swing upwardly and downwardly due to the inclination of the stem as it is gyrated around the body cavity, with the result that water from the orifices is distributed over a wide area around the sprinkler.

As the streams of water from the orifices 39 are slightly disrupted by the edges of the orifices 39, there is produced a sufficient scattering of water for distribution on the lawn in the area immediately surrounding the sprinkler for the low gallonage requirements herein contemplated.

From the above description it is seen that the sprinkler of this invention differs from that illustrated in Patent No. 2,639,191 as to the location of the inlet for the stem. This difference in structure produces substantially different results, as will appear from the following table which compares the performance characteristics of one sprinkler with the other. In this table Sprinkler No. 1 was made as shown in the accompanying drawing, while Sprinkler No. 2 was made according to that illustrated in said patent. Each sprinkler had three orifices 39 of 9/64 inch in diameter. The stem of each sprinkler was 5/16 inch in diameter. The outside diameter of the sprinkler body in each case was 5/8 inch. The sprinklers were alike in structure throughout except that in the case of Sprinkler No. 1 the lower end of the body was closed with a plug 22 and the stem did not project through the lower end of the sprinkler body, as was the case for Sprinkler No. 2. Also the cavity opening 17 for Sprinkler No. 1 was smaller than the corresponding opening in Sprinkler No. 2, such cavity opening in Sprinkler No. 1 being large enough only to accommodate inclination of the stem.

|  | Water supply at 10 lbs. pressure | | Water supply at 25 lbs. pressure | |
| --- | --- | --- | --- | --- |
|  | Gallons per minute | Diameter in feet of area sprayed | Gallons per minute | Diameter in feet of area sprayed |
| Sprinkler No. 1 | 3.5 | 40 | 4.56 | 42 |
| Sprinkler No. 2 | 5.5 | 32 | 7.8 | 42 |

From the above table it is seen that for Sprinkler No. 1 an increase of two and one-half times in water pressure in the sprinkler supply line resulted in an increase in the size of the area sprayed by only 5% in diameter, whereas for Sprinkler No. 2 the same increase in water supply pressure resulted in an increase of about 31% in diameter, yet at 25 lbs. pressure the respective areas covered were the same. At both 10 and 25 lbs. pressure, the gallonage for Sprinkler No. 1 was substantially less than that for Sprinkler No. 2. The conclusions to be reached from the above table are obvious, i.e. for high gallonage requirements use Sprinkler No. 2, and for low gallonage requirements; as for spraying a large area for a relatively long period of time, use Sprinkler No. 1.

Referring again to the drawing, the sprinkler of this invention is especially well adapted for use with a filtering means arranged to filter out any solid particles which may be carried in the water flowing through the riser thus to prevent such particles from entering the sprinkler. Such filtering means is designated generally by reference numeral 55. It comprises a cylindrical screen 56 having an upper annular ring 57 and a lower annular ring 58 by which the screen may be telescopically received over the sprinkler body to screen the slant slits 42. The rings 57 and 58 fit tightly on the sprinkler body and space the cylindrical screen 56 outwardly from the outside wall of the body. Disposed within that space is a sleeve 60 tightly fitting around the sprinkler body and adapted to be adjusted longitudinally of the sprinkler body to control the effective length of the slits 42 thereby to provide for control of the rate at which water may enter the sprinkler body at a given supply pressure.

While the instant invention has been shown and described herein, in what is conceived to be the most practical and preferred embodiment, it is recognized that departures may be made therefrom within the scope of the invention, which is therefore not to be limited to the details disclosed herein, but is to be accorded the full scope of the claims.

Having described my invention, what I claim as new and desire to secure by Letters Patent is:

1. A fluid discharging device comprising a body having wall means defining a cavity therein and an outer end, the body having a cavity opening formed in the outer end of the body, a tubular stem extending into the cavity through the cavity opening, the stem having an inner end portion disposed in the cavity and an outer end portion and an outlet orifice in the outer end portion thereof, stop means in the cavity proximate the cavity opening, stop means on the stem abutable against said stop means in the cavity for retaining the stem in the cavity, the stem having a fluid inlet opening formed in the inner end portion thereof and disposed in the cavity and spaced inwardly of said stop means on the stem, said wall means having a plurality of openings extending obliquely therethrough for directing fluid into the cavity, said openings being angularly disposed with respect to the cavity for directing fluid toward the sides thereof to impart rotary motion to fluid in the cavity so as to gyrate the stem in the cavity and cause rotation of the stem on its own axis, the cavity being closed except for said cavity opening and said oblique openings and the latter providing the sole access for incoming fluid entering the cavity.

2. A lawn sprinkler for producing a relatively low gallonage spray, comprising a cylindrical body having an axial bore extending therethrough, the body having an upper end and a lower end and comprising a plate closing the lower end of the bore and a sleeve fixed in the upper end of the bore, said sleeve defining an upper end opening for the body, a tubular stem arranged longitudinally in the bore and extending out through said opening, that end of the stem within the bore being a lower end and that end of the stem extending out through said opening being an upper end, the stem having an inlet opening formed in the lower end portion thereof, the stem having at least one orifice formed in the upper end thereof for discharge of water from the stem in a stream extending radially outwardly from the sprinkler, a collar fixed around the stem and disposed in said bore for contact with said sleeve to limit upward movement of the stem, the body having a plurality of slits formed therein extending longitudinally of the body for flow of water from outside the body through the slits and into the said bore, the slits being angularly disposed with respect to the radii of the body for imparting rotary motion to water in the bore of the body so as to gyrate the stem in the cavity and cause rotation of the stem on its axis.

3. A lawn sprinkler comprising a cylindrical body having an upper end and side walls defining a cavity in the body, the body having a cavity opening formed in the upper end thereof, a tubular stem extending through the cavity opening, the stem having a lower end portion disposed in the cavity with an inlet opening formed therein and an upper end portion with an outlet orifice formed therein for spraying water radially outwardly from the sprinkler, stop means on the stem engageable with the body for limiting upward movement of the stem with respect to the body, the body having a plurality of slant openings formed in the side walls thereof for flow of water into the cavity, the slant openings being angularly disposed with respect to the radii of the body for imparting rotary motion to water in the cavity so as to gyrate the stem in the cavity and cause rotation of the stem on its axis, the cavity being closed except for said cavity opening and said slant openings, said slant openings providing the sole access for incoming water entering the cavity and a sleeve disposed around the body and movable longitudinally of the body for restricting the effective size of said slant openings thus to control the rate of water admitted to the sprinkler body.

4. A fluid discharging device comprising a cylindrical body having side walls of circular cross-section, the body having a cavity formed therein and an outer end, the body having a cavity opening formed in the outer end of the body, a tubular stem extending into the cavity through the cavity opening, the stem having an inner end portion disposed in the cavity and an outer end portion and an outlet orifice in the outer end portion thereof, stop means in the cavity proximate the cavity opening, stop means on the stem abutable against said stop means in the cavity for retaining the stem in the cavity, the stem having a fluid inlet opening formed in the inner end portion thereof and disposed in the cavity and spaced inwardly of said stop means on the stem, the body having a plurality of slant openings formed in the side walls of the body for introducing fluid into the cavity, said slant openings being angularly disposed with respect to the radii of the body for imparting rotary motion to fluid in the cavity so as to gyrate the stem in the cavity and cause rotation of the stem on its own axis, the cavity being closed except for said cavity opening and said slant openings and the latter providing the sole access for incoming fluid entering the cavity.

References Cited in the file of this patent

UNITED STATES PATENTS

| | | |
|---|---|---|
| 1,882,922 | Robinson | Oct. 18, 1932 |
| 2,639,191 | Hruby | May 19, 1953 |
| 2,909,326 | Hruby | Oct. 20, 1959 |